US011789911B1

(12) United States Patent
Surabhi et al.

(10) Patent No.: US 11,789,911 B1
(45) Date of Patent: Oct. 17, 2023

(54) SCALABLE PERMISSIONS MANAGEMENT FOR GRANULAR LEVELS OF DATABASE ACCESS

(71) Applicant: Amazon Technologies, Inc., Seattle, WA (US)

(72) Inventors: Vamshi Krishna Surabhi, Redmond, WA (US); Dinesh Thangaraju, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 9 days.

(21) Appl. No.: 17/386,349

(22) Filed: Jul. 27, 2021

(51) Int. Cl.
*G06F 16/21* (2019.01)
*G06F 16/25* (2019.01)
*G06F 21/60* (2013.01)
*G06F 21/62* (2013.01)

(52) U.S. Cl.
CPC ............ *G06F 16/21* (2019.01); *G06F 16/256* (2019.01); *G06F 21/602* (2013.01); *G06F 21/6227* (2013.01)

(58) Field of Classification Search
CPC ...... G06F 16/21; G06F 16/256; G06F 21/602; G06F 21/6227
USPC ........................................................ 707/802
See application file for complete search history.

(56) References Cited

U.S. PATENT DOCUMENTS

| 7,461,395 | B2 * | 12/2008 | Ng ........................... G06F 21/10 |
| | | | 726/4 |
| 7,761,404 | B2 * | 7/2010 | Chen ....................... G06F 21/10 |
| | | | 707/999.102 |
| 8,095,531 | B2 * | 1/2012 | Weissman ........... G06F 21/6227 |
| | | | 707/999.009 |
| 2011/0219425 | A1 * | 9/2011 | Xiong ..................... G06F 21/00 |
| | | | 726/28 |
| 2015/0040186 | A1 * | 2/2015 | Isomura ................ H04L 63/108 |
| | | | 726/3 |
| 2016/0125197 | A1 * | 5/2016 | Winters ............... G06F 21/6227 |
| | | | 707/783 |
| 2017/0220814 | A1 * | 8/2017 | Pathak .................. G06F 21/105 |
| 2019/0303614 | A1 * | 10/2019 | Do ......................... G06F 3/0604 |
| 2021/0097194 | A1 * | 4/2021 | Khanduja ............... G06F 21/10 |
| 2021/0409192 | A1 * | 12/2021 | Gollogly ............. H04L 63/0807 |

* cited by examiner

*Primary Examiner* — Joshua Bullock
(74) *Attorney, Agent, or Firm* — Robert C. Kowert; Kowert, Hood, Munyon, Rankin & Goetzel, P.C.

(57) ABSTRACT

A permissions management service may allow a large number of user to access database objects of a database service in a scalable manner. After a data owner on-boards a database of a database service with the permissions management service, the data owner may create a data catalog for a user or user group that indicates the database objects (e.g., tables, views) that are available for the user to request access to. A request from a user may be authenticated by the permissions management service using federation/single sign-on. The user may select database objects from a data catalog of objects that are available for the user to request access to. The permissions management service sends an access request to the database service, indicating the selected database objects. The database service may then grant to the user permission to access the selected objects (e.g., via grant commands).

20 Claims, 9 Drawing Sheets

SCALABLE PERMISSIONS MANAGEMENT FOR GRANULAR LEVELS OF DATABASE ACCESS

BACKGROUND

The number of users for various database applications often grows by a substantial amount over time, increasing the burden on database administrators (e.g., data owners) to manage access to different types of data. For example, certain users or groups of users may be allowed to access data that is stored in one set of tables, but may not have permission to access different data that is stored in another set of tables. When a user requests access to a database, a database administrator may need to execute certain database statements in order to grant the user access to certain tables during a database session. When other users also request access, the database administrator may need to grant those other users access to different tables, depending on the permissions assigned to those users. As the number of users grows large, the process of granting permissions for different users across different sessions can become extremely burdensome and time-consuming. Moreover, a user may not be aware of which tables of a database that the user has permission to request access to, which can place additional support burden on the database administrator and reduce user productivity.

Figure 1:
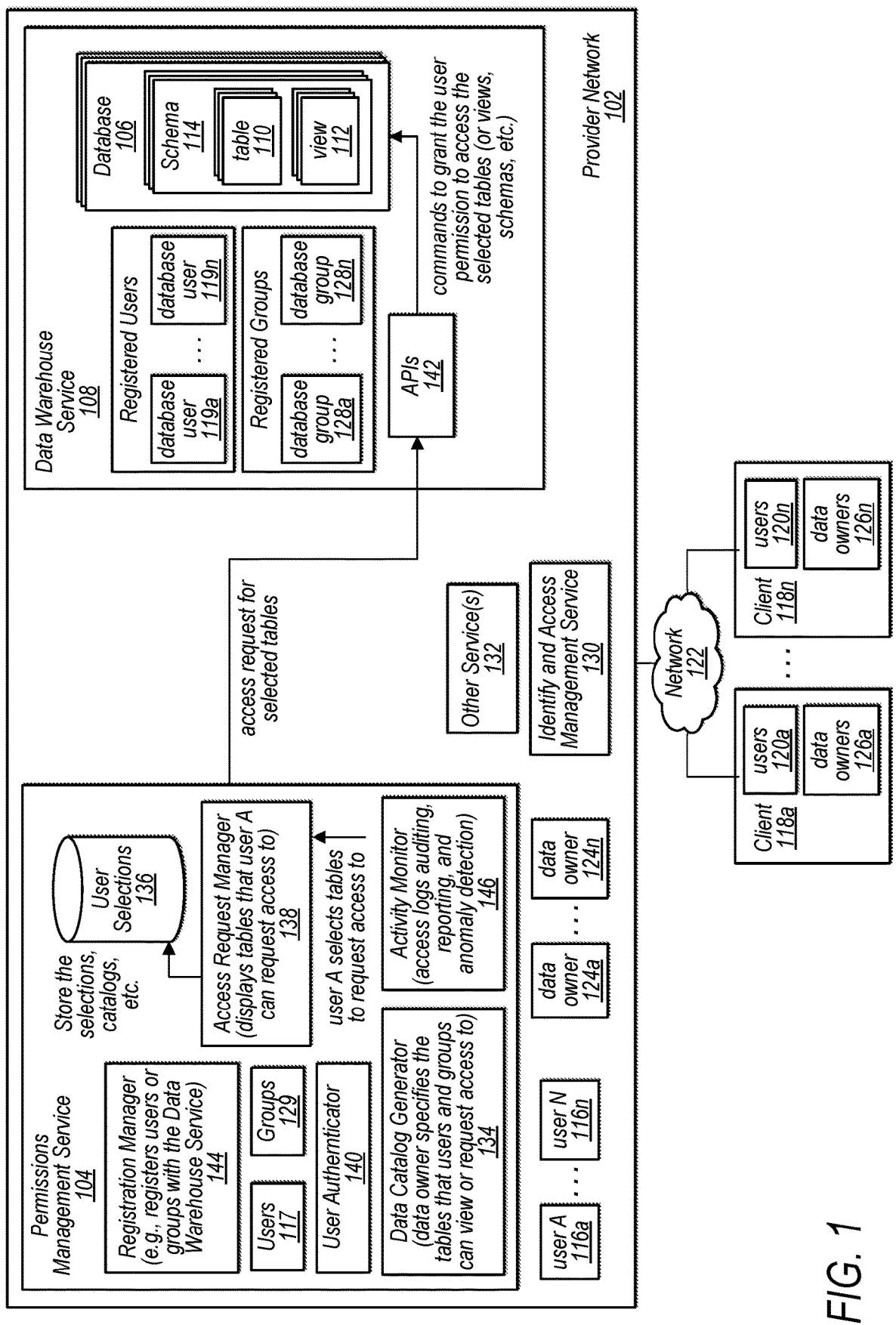
FIG. 1 is a logical block diagram illustrating a system for implementing scalable permissions management for granular levels of database access, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement scalable permissions management for granular levels of database access, according to some embodiments. In embodiments, implementing scalable permissions management for granular levels of database access may reduce the amount of administrative setup time and/or computing/storage resources used to configure/provide data access to various users and/or user groups, compared to other techniques.

Embodiments may leverage a permissions management service in a way that automatically handles user requests to access database objects (e.g., tables, views) for any number of database objects. For example, the permissions management service may display to the user a catalog of available objects, receive selections from the catalog for particular database objects, and send, to a database, access requests for the selected objects. Therefore, embodiments may reduce or eliminate the number of incorrect access grants (e.g., granting a user access to the wrong table) and reduce or eliminate the need for a database administrator to enable access to database objects for each user request, compared to traditional techniques of managing database access.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 7 and described below.

This specification begins with a description of a system for implementing scalable permissions management for granular levels of database access. A number of different methods and techniques to implement scalable permissions management for granular levels of database access are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for implementing scalable permissions management for granular levels of database access, according to some embodiments.

In the depicted example, a provider network 102 includes a permissions management service 104 that implements scalable permissions management for granular levels of user access to any number of databases 106 of a data warehouse service 108. In embodiments, a data warehouse service (e.g., data warehouse service 108) may be any type of database service that manages user and/or group access to database objects (e.g., tables 110, views 112, schemas 114, groups of tables) and/or portions of database objects (e.g., table columns, table rows) of any number of databases 106. In some embodiments, some or all of the functionality of the permissions management service 104 may be considered a part of the data warehouse service 108 (e.g., as a wrapper or front end component/application that handles functionality of the permissions management service 104 described herein).

As shown, any number of internal users 116 within the provider network may be registered with the permissions management service as a user 117 and registered with the data warehouse service as a registered database user 119 that may be granted access to objects of one or more databases 106 (and/or granted access to a database 106). For example, user A 116*a* may be a person who belongs to part of an organization within a service provider that owns the provider network and user A 116*a* may access the data warehouse service 108 using a computing device within the provider network 102.

In embodiments, any number of remote client networks of external clients 118 of the provider network 102 may each include any number of external users 120 that may be registered with the permissions management service as a user 117 and registered with the data warehouse service as a registered database user 119 that may be granted access to objects of one or more databases 106 (and/or granted access to a database 106). The external users may each access (via communication using a wide area network 122, such as the Internet) the permissions management service and the data warehouse service 108 using a computing device within a client network 118.

In embodiments, any number of internal data owners 124 within the provider network may be assigned the ability to create any number of databases/objects and/or manage user/group access to any number of databases/objects of the data warehouse service 108. In various embodiments, a data owner may be considered a database administrator and/or have some or all of the rights of a database administrator. An internal data owner may create/manage objects (via communication using a wide area network 122) of the data warehouse service 108 using a computing device within the provider network 102.

In various embodiments, any number of client networks of external clients 118 of the provider network 102 may each include any number of external data owners 126 that may each be assigned the ability to create any number of databases and/or manage user/group access to any number of databases of the data warehouse service 108. An external data owner may create/manage objects of the data warehouse service 108 using a computing device within a client network 118.

The data warehouse service 108 may also include any number of registered database groups 128 that may be registered with the data warehouse service. Any number of internal and/or external users may be a member of a database group 128 and may be granted access to objects of one or more databases 106 based on the user's membership in the database group 128. The permissions management service may also include any number of groups 129 of users that are registered with the permissions management service. As described below, a given group 129 of users registered with the permissions management service may or may not correspond to the same database group 128 of database users of the data warehouse service.

In various embodiments, each group in the permissions management service may not necessarily map to a corresponding group in the data warehouse service (although in embodiments, at least some of groups in the permissions management service may map to a corresponding group in the data warehouse service). For example, a user might be a member of five groups in the permissions management service, but the corresponding registered database user may not be a member of any registered group in the data warehouse service, and vice versa. This may provide flexibility for a data owner to create catalogs that are available for selection and/or viewing by specific groups of users in the permission management service, even though the registered database users that correspond to those users may not be members of any registered database groups. For example, during configuration of the permissions management service, a data owner may create a group of users that includes 10 of the registered users of the permissions management service, such that a particular data catalog of database objects will be available to any of the users of the group to select from to request access to.

Figure 3:
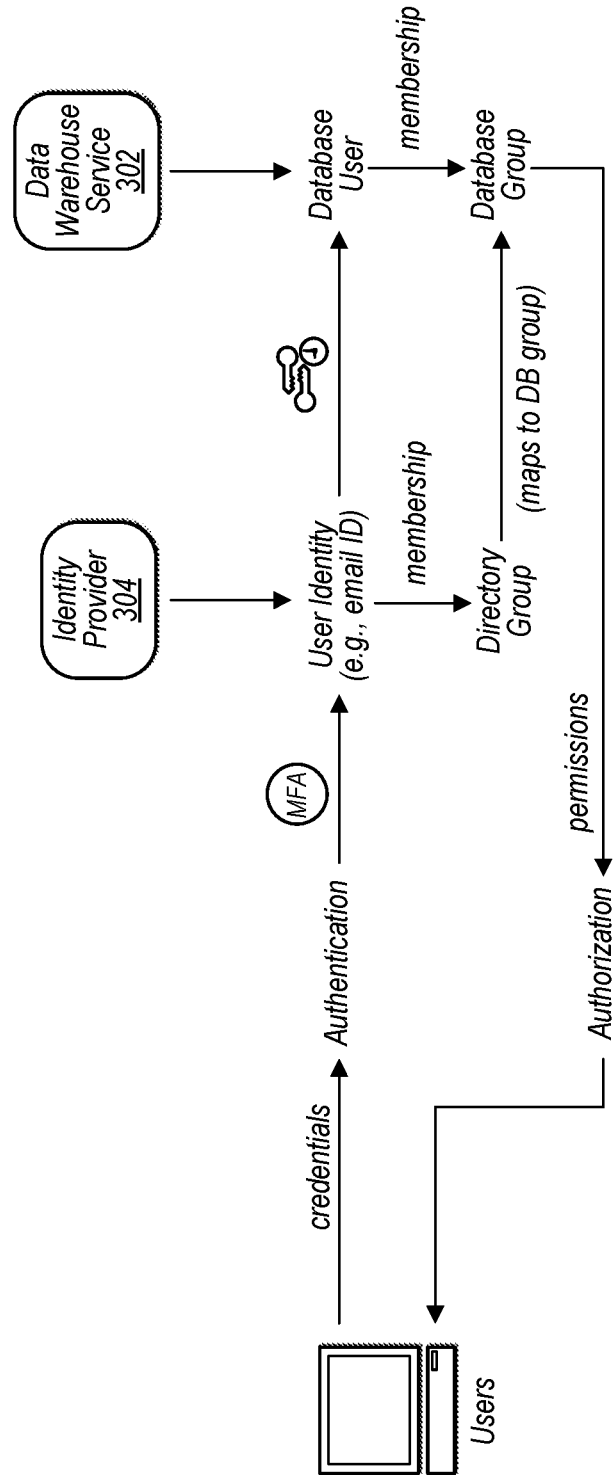
FIG. 3 is a logical block diagram illustrating a system for authenticating users and authorizing users to access database objects, according to some embodiments.

In embodiments, at least some of the database groups may be granted access to certain database objects in order to allow for fine grained user access to database objects, as described for FIG. 3. In some embodiments, the data warehouse service may also have any number of other database groups (e.g., created by a database administrator) that have been granted access to any number of database objects. For example, database users may be assigned as members to one of these groups, and they may or may not be registered users of the permissions management service.

As shown, the provider network may include an identity and access management service 130. The identity and access management service 130 may perform any portion of or all of the functionality of authentication and/or authorization described herein. The provider network may include any number of other services 132, some of which may be used by the data warehouse service and/or the permissions management service. For example, another database service may be used by the data warehouse service and/or the permissions management service to store any objects, data, metadata, and/or configuration data described herein.

In the depicted example, the permissions management service 104 includes a data catalog generator 134 that may receive, from a data owner, specification (e.g., an input/indication provided via a user interface/API provided by the service 104) of any number of objects (e.g., tables, groups of tables, views, schemas of a database) of one or more corresponding databases of the data warehouse service that are to be available for one or more particular users and/or users of one or more particular groups to request access to (e.g., or available to view as a list but not available to request access to).

As an example, a data owner may specify 10 tables that are to be available for users to request access to or 10 tables that are to be available to particular users that are members of a user group (e.g., group A 128*a*) to request access to. As indicated above, the data owner may specify that the catalog of objects (e.g., tables) is to be available to the user/particular user to view, but the user/particular may not request access. For example, a list of table identifiers/names may be displayed, but the user/particular user may be unable to request access to any of them.

After receiving the specification of the objects that are to be available to the users (or particular users of the user group), the data catalog generator 134 may store a data catalog that indicates the specified objects (e.g., at the data store 136 or another data store). At a later point, the permissions management service 104 may receive a request from one of the users (or from a particular user of the user group). The request may be a request to provide an indication of the objects that are available for the user/particular user of the group. In the example embodiments, the request may be received and/or processed by the access request manager 138.

In embodiments, the permissions management service may authenticate and/or authorize the request based at least on credentials provided by the request (e.g., user login credentials uniquely associated with the user). The authentication and/or authorization may be performed by the user authenticator 140 and/or the identity and access manager 130.

After authenticating the request, the permissions management service (e.g., the access request manager 138) may determine the objects to be available for the user/particular user to request access to (e.g., based on identifying the user as one of the users previously specified by the data owner or based on identifying the user as a member of the group previously specified by the data owner). For example, the permissions management service may identify the specified objects indicated by the data catalog that was previously stored. The permissions management service may then provide an indication of the objects to the user/particular user (e.g., as a list of objects indicated by the data catalog, available for selection via user interface).

The permissions management service may then receive, from the user/particular user via the user interface, a selection of one or more of the objects of the data catalog. Based on receiving the selection of the one or more objects (e.g., in response to receiving the selection), the permissions management service may send to the data warehouse service an access request that indicates the one or more objects that were selected. For example, the access request may include identifiers for five tables that were selected by the user. The access request may also include a unique identifier of the user and/or security credentials of the user.

In embodiments, the data warehouse service receives the access request (e.g., via an application programming interface 142 (API)) and based on the reception of the access request, the data warehouse service grants to the user/particular user permission to access the selected objects. For example, in response to receiving the access request via the API 142, the data warehouse service may issue a command to grant to the user/particular user access to each of the five tables identified by the access request. In embodiments, the user/particular user may then access the tables (e.g., with read/write access or read only access).

In some embodiments, the specification from the data owner may indicate that one or more of the objects requires access approval of a given data owner in order to grant the user/users of the group permission to access the objects. For example, if a particular table requires approval from a given data owner, then after the user/particular user selects the table, the permissions management service may send, to the data owner or another data owner of the table, a request for access approval for the user to access the table. If the permissions management service receives, from the data owner or other data owner, an indication of the access approval for the table, then the permissions management service may send to the data warehouse service an access request that includes an indication of the table. The data warehouse service may then grant to the user permission to access the table (e.g., via a command, as described above).

In embodiments, metadata of the object (e.g., stored in a particular table column) may indicate that approval of a given data owner is requested in order for the permissions management service to grant the user/particular user permission to access the object. In response to receiving, from the user, selection of a table, the permissions management service may determine that the metadata of the table indicates that the table requires access approval of the given data owner in order to grant the user/particular user permission to access the table. As described above, the permissions management service may send to the data warehouse service an access request that includes an indication of the table if it receives, from the data owner or other data owner, an indication of the access approval for the table.

In some embodiments, the specification from the data owner may indicate that only a subset of columns or rows of a table (e.g., any number of particular columns or rows less than the total number of columns or rows) are to be available for the user/users of the group to be available to request access to. For a subset of columns, the permissions management service will provide, to the user/particular user, an indication of the subset of columns as available to request access to, without providing an indication of the remaining columns of the table. For a subset of rows, the permissions management service will provide, to the user/particular user, an indication of the subset of rows as available to request access to, without providing an indication of the remaining rows of the table.

A data owner may have the ability to add additional objects (or portions of objects, such as additional rows or tables) that are to be available for the user/users of a group to request access to. Upon receiving a specification of the additional objects or object portions, the permissions management service may update the data catalog that indicates the specified objects/object portions (e.g., at the data store 136 or another data store). This allows a data owner the ability to easily update data catalogs for users or user groups at any point.

In the example embodiment, the permissions management service may include a data warehouse registration manager 144 that registers users and groups with the data warehouse service, if necessary. For example, if a request from a user is authenticated by the permissions management service but the permissions management service determines that the user is not yet registered with the data warehouse service, then the permissions management service may send a request to the data warehouse service to register the user.

The permissions management service may also include an activity monitor 146. The activity monitor may perform various tasks based on requests from a data owner/database administrator. For example, a data owner may request a report/information (e.g., for a specific time period such as the last 24 hours) that indicates users and/or groups that accessed one or more objects or databases, the number of times the user and/or groups accessed the one or more object or databases, and/or one or more database accesses identified by the permissions management service as anomalous accesses. In embodiments, the permissions management service may generate the report in response to a request from the data owner and/or may generate the report according to a schedule (e.g., once every 24 hours).

Figure 2:
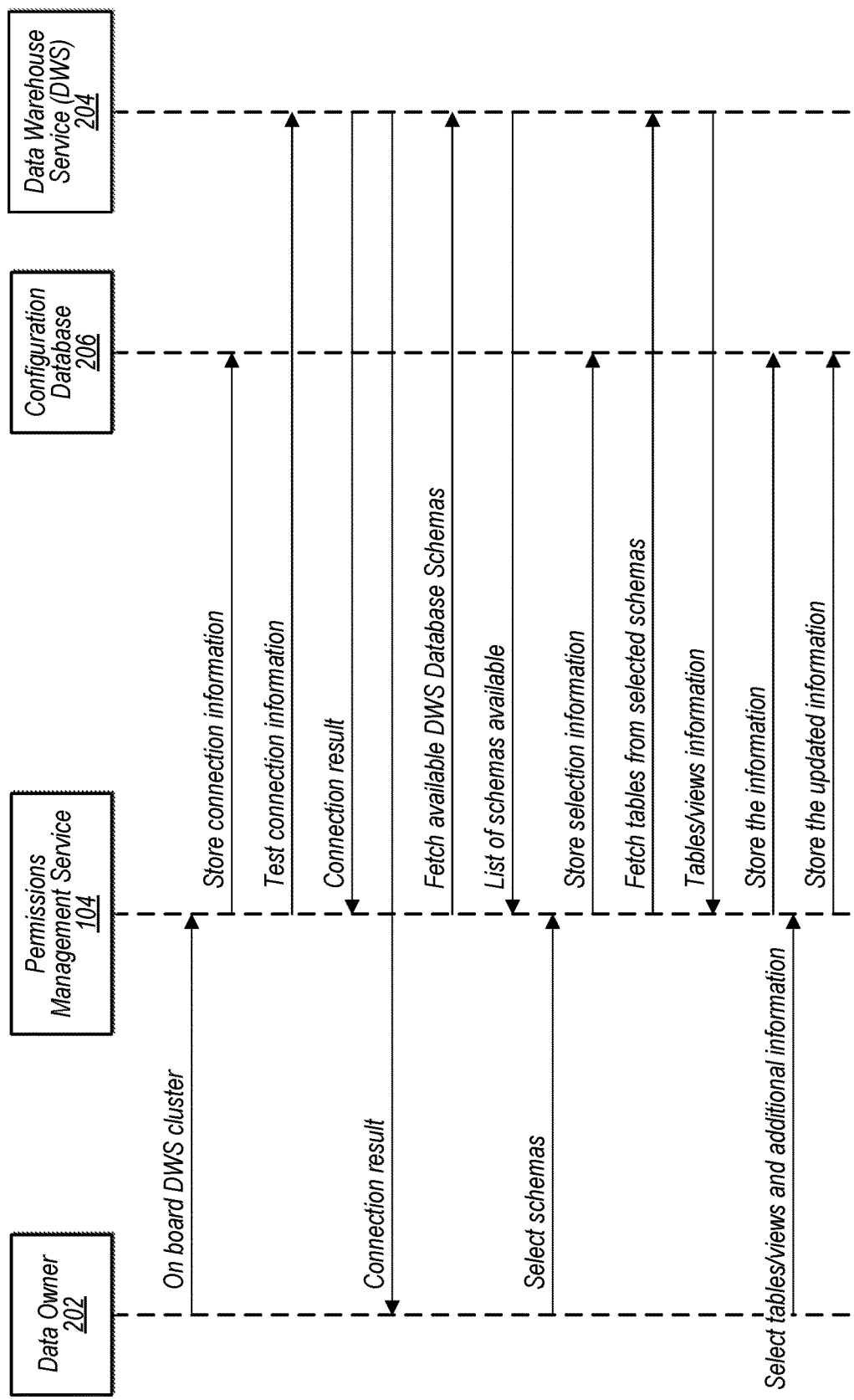
FIG. 2 illustrates examples of actions performed by a data owner to configure a system to implement scalable permissions management for granular levels of database access, according to some embodiments.

FIG. 2 illustrates examples of actions performed by a data owner to configure a system to implement scalable permissions management for granular levels of database access, according to some embodiments.

As shown, a data owner 202 of a database of a data warehouse service 204 (DWS) provides an indication to the permissions management service 104 to on-board a DWS cluster (e.g., the database itself and/or compute resources associated with the database). For example, the data owner may provide one or more identifiers of the cluster/database.

The permissions management service may obtain connection information for the cluster/database and store the connection information in a configuration database 206 of the permissions management service. The data owner may then use the permissions management service to test connection information to verify that a connection can be established between the permissions management service and the cluster/database. As shown, the DWS may return a result to the permissions management service and to the data owner that indicates the connection was successfully established.

Next, the permissions management service may fetch from the DWS a list of the schemas of the database that are available to be used with the permissions management service. The list of schemas are provided to the permissions management service and the data owner then selects the schemas that he/she would like to be made available for use with the permissions management service. The permissions management service stores the list of selected schemas into the configuration database.

The permissions management service may then fetch from the DWS a list of the tables and/or views of the selected schemas that are available to be used with the permissions management service. The list of tables and/or views of the selected schemas are provided to the permissions management service and the data owner then selects the tables and/or views that he/she would like to be made available for use with the permissions management service.

In embodiments, the data owner may also add additional information/metadata to one or more of the tables/views (e.g., metadata that indicates the table requires access approval of a given data owner in order to grant users permission to access the table). The permissions management service stores the list of selected tables/views and additional data into the configuration database. At any point, the data owner may update the configuration database by adding/removing schemas, tables, views, and/or metadata.

FIG. 3 is a logical block diagram illustrating a system for authenticating users and authorizing users to access database objects, according to some embodiments. Although the permissions management service is described as performing actions (e.g., authentication, obtaining temporary credentials, etc.), in various embodiments, at least some (or all) of the actions may be performed by one or more other services/applications (e.g., other services of the provider network or other networks that are external to the permissions management service).

In the example embodiment, a user (e.g., a person/individual that accesses the permissions management service and/or the data warehouse service via a user interface) that is registered as a user with the permissions management service (e.g., service 104 of FIG. 1), may be referred to herein as a "user." The person/individual may also be registered as a user with the data warehouse service 302 (e.g., service 108 of FIG. 1), and may be referred to herein as a "database user." However, the "user" and "database user" may both refer to the same user (e.g., the same person/individual accessing the services via a user interface/device at a client network or the provider network) and may each be identified using the same user ID or based on the same user ID. Therefore, a given user that is registered/maintained as a user at the permissions management service (as a "user") may also be registered/maintained as a user at the data warehouse service (as a "database user"), and therefore the user and the database user may refer to the same user identity/individual.

When a user requests access to the permissions management service (e.g., using an SQL client), the service may authenticate the user based at least on a user identity/unique ID for the user (e.g., an email address of the user) included in credentials provided by the user. In embodiments, the permissions management service may use various techniques to authenticate the user, such as multi-factor authentication.

In the depicted example, an identity provider/federation service 304 may be used to authenticate the user (or as part of the authentication process). In various embodiments, any other techniques may be used by the permissions management service in order to authenticate the user based on credentials provided by the user/user request (FIG. 4 describes an example technique for authenticating users for accessing a data warehouse service).

In response to authentication of the user, the SQL client may fetch temporary credentials (e.g., a security token fetched from a service) through the use of roles (e.g., a database access role assigned by an identity and access management service to the user) and/or through the use of an identity provider/federation service 302. The user can be logged into the data warehouse service as a database user through the temporary credentials (e.g., as a "database user").

In embodiments, even though the user is logged into the data warehouse service as a database user, the user is unable to query objects of the data warehouse service until the data warehouse service authorizes the database user for those objects (e.g., by granting permission to the database user to access the objects). For example, if the user requests access to table A (e.g., by selecting table A from a catalog/list provided by the permissions management service), then the permissions management service may send to the data warehouse service an access request that includes an indication of table A and/or a user identifier for the user. The data warehouse service may receive the access request and in response, grant to the database user permission to access table A.

In some embodiments, in order to grant to the database user permission to access table A, the data warehouse service may map the database user to a particular database group that has been granted permission to access table A (e.g., assign the user to be a member of the particular database group/add the user as a member of the particular database group). For example, "database group A" may have permission to access table A (e.g., read permission, read/write permission, etc.). Therefore, the data warehouse service may map the database user (e.g., a user ID for the database user) to "group A." Based on this mapping, the data warehouse service may authorize the database user to access table A according to the permissions granted to database group A for table A (e.g., read data, write data, etc.).

In embodiments, the user may be assigned to be a member of a particular group that has been created/registered with the permissions management service (e.g., a group that is based on a lightweight directory access protocol (LDAP)). In some embodiments, the group in the permissions management service may map to a corresponding database group (e.g., database group X) that is registered with the data warehouse service. Based on this mapping, the data warehouse service may authorize the database user to access the database object(s) according to the permissions granted to database group X (e.g., read/write access to tables A, B, C).

In some embodiments, a different database group may be granted permission to access each of the objects or at least a portion of the database objects. For example, "database group B" may have permission to access table B, "database group C" may have permission to access view C, "database group D" may have permission to access five columns out of 20 columns of table D, "database group E" may have permission to access ten rows out of 200 rows of table e, etc.

In embodiments, any number of registered database users may be mapped to a given database group. For example, 100 different database users may be mapped to database group A, which results in each of the 100 database users having authorization/permission to access table A (e.g., while the temporary credentials are valid for each database user). Out of those 100 database users, 10 of them may also be mapped to database group B, which results in those 10 users also having authorization/permission to access table B. This technique allows for automatically assigning fine grained permissions to different users of the data warehouse service. For example, in response to receiving indications of 10 database objects selected by a user from data catalog provided by the permissions management service, the data warehouse service may map the user to 10 different groups that each have been granted permission to access a respective one of the selected database objects).

The above process may be performed for any number of different users and for any number of corresponding objects (e.g., corresponding to the number of objects that a given user selects from the catalog/list of objects available to request access to). As another example, one user may be mapped to database groups A, B, and C, (in response to selecting tables A, B, and C from the data catalog) while a different user may only be mapped to database groups B and C (in response to selecting only tables B and C from the data catalog). In embodiments, a user will be authorized to access only the objects that the user selected, and the user will not be granted authorization to access any of the other objects on the catalog/list that were not selected. This may allow a database owner/administrator to implement fine grained permissions to many database users without manual intervention.

For a database with 100 objects and 100 database users, the data warehouse service can grant permissions in 100*100 ways (10,000), which would be extremely time consuming and/or too resource intensive to be managed manually (a database owner be unable to do this, especially within a certain time window). The process for a database owner to manually grant permissions would involve multiple steps for the requestor and/or the database owner. For example, the requester may need to identify the database owner, the requestor then requests permissions to access the object(s) using an email/ticket or other method, the database owner needs to review the email/ticket and write SQL statements in the database to execute the permissions request, and the database owner informs the requestor upon completion of executing the permissions grant(s) for the object(s). For any changes to be made by the requestor for permissions access to objects of the data warehouse service, the above steps may need to be performed multiple times, increasing the amount of time/resources needed to update/maintain the desired permission access for users.

Figure 4:
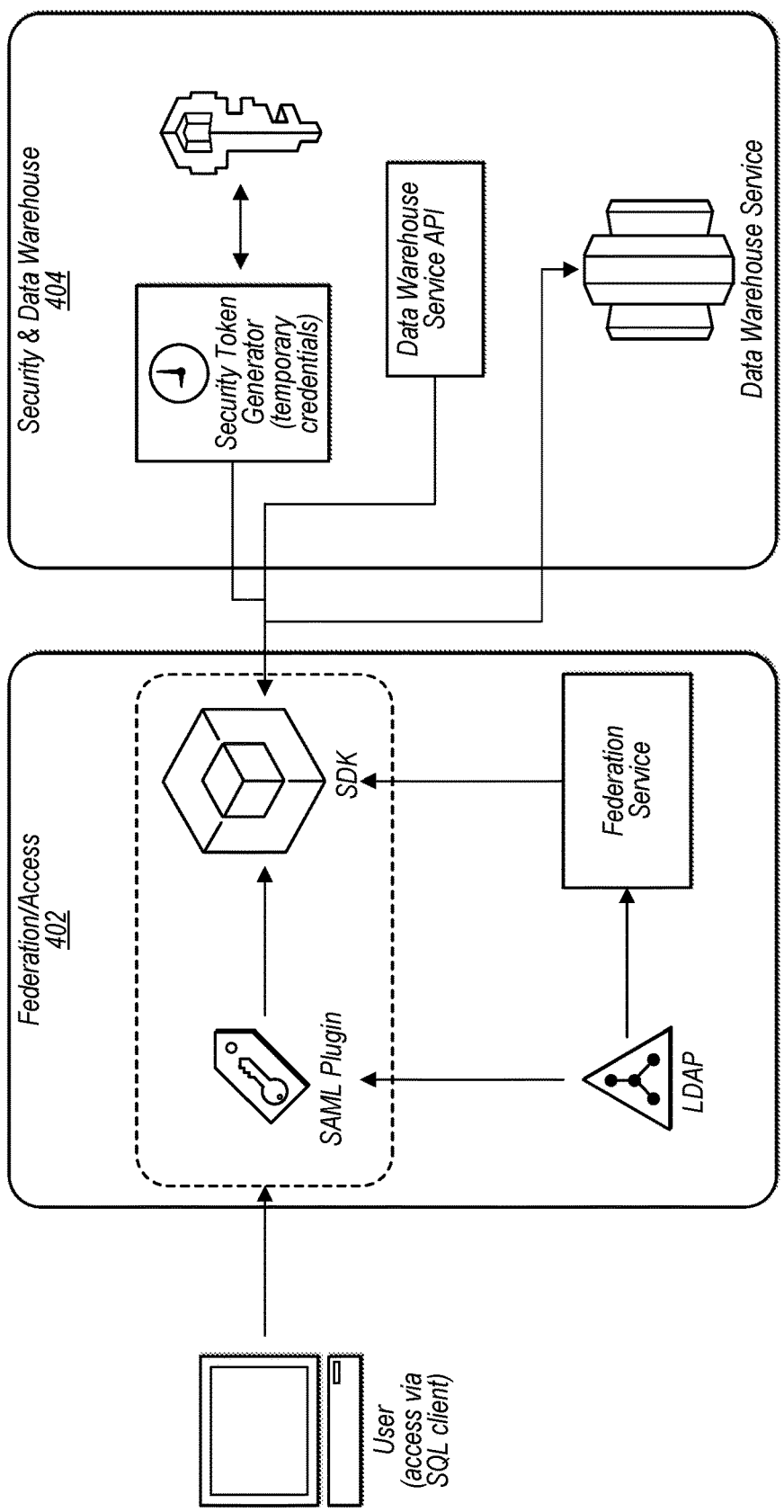
FIG. 4 is a logical block diagram illustrating a system for accessing a data warehouse service using federated login and a security token, according to some embodiments.

FIG. 4 is a logical block diagram illustrating a system for accessing a data warehouse service using federated login and a security token, according to some embodiments.

In the depicted example, a federation/access 302 portion of the system may include any number of software applications that may communicate with each other to enable federated login of users. By using federation/single sign on login, the permissions management service provides a more secure was of authenticating users to login to the service (e.g., by providing temporary token credentials that remain valid for a maximum time period such as 60 minutes).

In the example, a security assertion markup language (SAML) component and a federation service may communicate with a software development kit (SDK) component and/or a lightweight directory access protocol (LDAP) component in order to perform authentication of a user and to pass the user's identity and authorization level to the security and data warehouse services 304 to generate a security token.

As shown, the SDK component may obtain a security token from a security token generator that allows the user to access the data warehouse service for a certain period of time (e.g., a predetermined amount of time in which the security token for the user is valid). In embodiments, the user authentication 140 and/or the identity and access management service 130 may perform some or all of the above-described functionality. In embodiments, the security token allows the user to access objects of one or more databases of the data warehouse service after the data warehouse service grants permission to the user to access those objects (e.g., based on a user request sent to the permissions management service, as described above).

Figure 5:
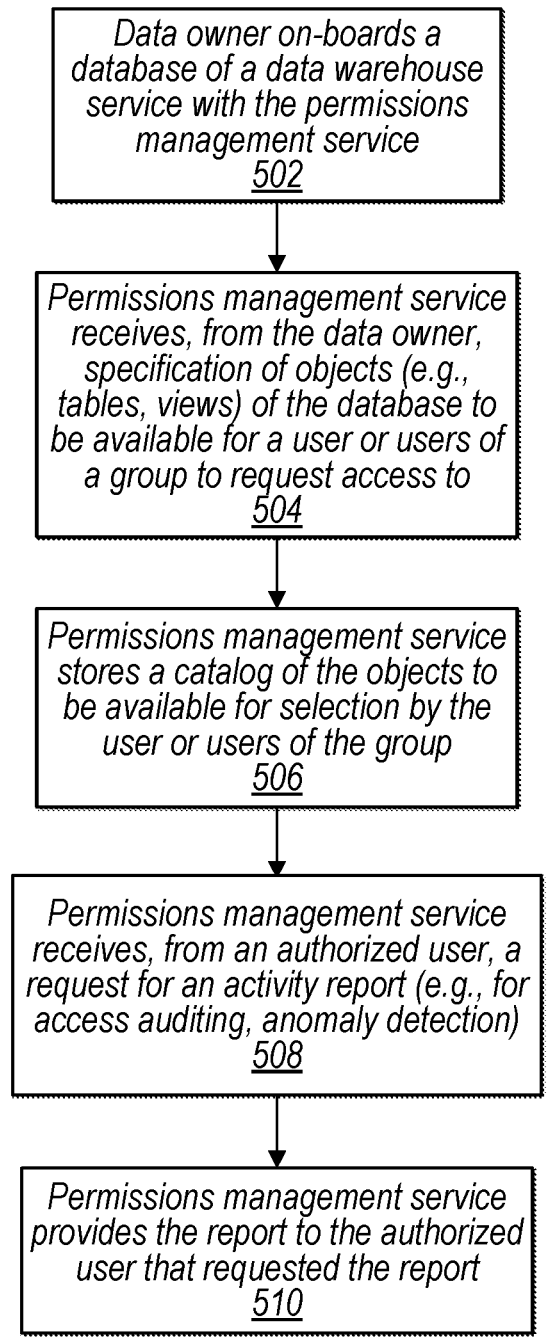
FIG. 5 is a high-level flowchart illustrating various methods and techniques for a data owner to configure scalable permissions management for granular levels of database access and to monitor database activity, according to some embodiments.

FIG. 5 is a high-level flowchart illustrating various methods and techniques for a data owner to configure scalable permissions management for granular levels of database access and to monitor database activity, according to some embodiments. In various embodiments, any of the functionality described for any portions of the flowcharts 5-7 may be performed by any of the components of FIGS. 1-4 and/or 8.

Figure 6:
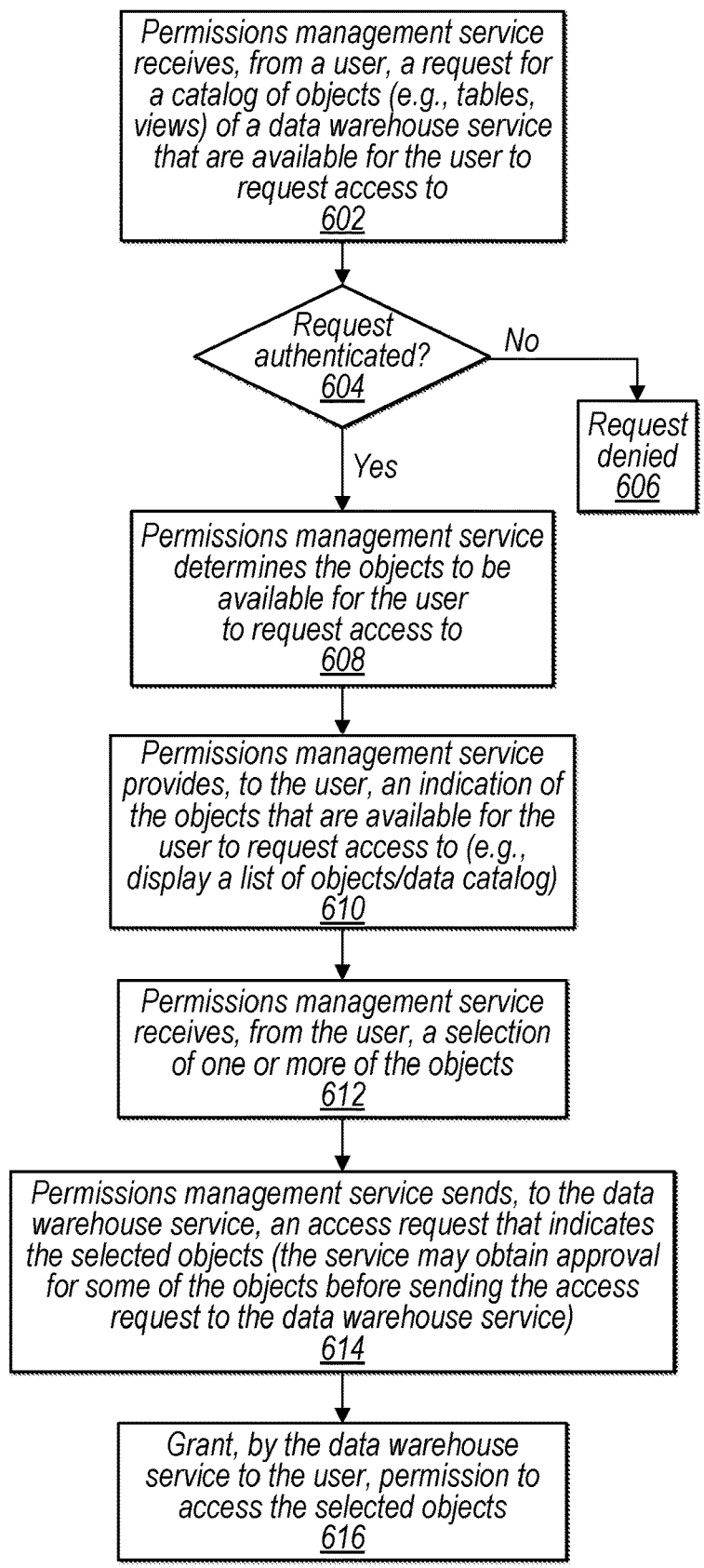
FIG. 6 is a high-level flowchart illustrating various methods and techniques to implement scalable permissions management for granular levels of database access, according to some embodiments.

These techniques, as well as the techniques discussed with regard to FIGS. 6 and 7, may be implemented using components or systems as described above with regard to FIGS. 1-4, as well as other types of components or systems, and thus the following discussion is not intended to be limiting as to the other types of systems that may implement the described techniques. For example, the techniques may be implemented by a simulation environment of a provider network and/or a client device.

At block 502, a user a data owner on-boards a database of a data warehouse service with the permissions management service. As described herein, a data warehouse service may include any type of database service that provides access and/or management for objects of one or more databases. FIG. 2 provides examples of some actions that are performed to on-board a database.

At block 504, the permissions management service receives, from the data owner, specification of objects (e.g., tables, views) of the database that are to be available for a user or users of a group to request access to. At block 506, the permissions management service may then store a catalog of the objects to be available for selection by the user or users of the group.

At block 508, the permissions management service may receive, from and an authorized user (e.g., the data owner, a user, a database administrator, authorized to access the activity report.) a request for an activity report (e.g., a report of access auditing, anomaly detection). At block 510, the permissions management service provides the report to the authorized user that requested the activity report. In embodiments, at least some or all of the data used to generate the activity report may be collected and stored at centralized reporting data store/database.

FIG. 6 is a high-level flowchart illustrating various methods and techniques to implement scalable permissions management for granular levels of database access, according to some embodiments.

At block 602, a permissions management service receives, from a user, a request for a catalog of objects (e.g., tables, views) of a data warehouse service that are available for the user to request access to. At block 604, the permissions management service determines whether the request is authenticated based at least on credentials provided by the request (e.g., based on federated user login). If not, then at block 606, the permissions management service denies the request.

If the permissions management service determines that the request is authenticated, then at block 508, the permissions management service determines the objects to be available for the user to request access to (e.g., based on specifications/indications previously provided by a data owner and saved in a configuration data store of the permissions management service). At block 610, the permissions management service provides, to the user, an indication of the objects that are available for the user to request access to (e.g., providing a list of the objects/data catalog via a graphical user interface on a display of the user's computing device).

At block 612, the permissions management service receives, from the user, a selection of one or more of the objects and/or one or more portion of one or more of the objects (e.g., via mouse, keyboard, or other input). At block 614, the permissions management service sends, to the data warehouse service, an access request that indicates the selected objects (e.g., tables, views) and/or portions of selected objects (e.g., rows, columns). In embodiments, for one or more of the selected objects, access approval for the object may be required (e.g., from a data owner or other individual) before an access request for the selected object may be sent to the data warehouse service. At block 616, the data warehouse service grants, to the user, permission to access the selected objects and/or portions of selected objects indicated by the request (e.g., via generating/executing a command to grant access to the user to each of the selected objects and/or portions of selected objects).

Figure 7A:
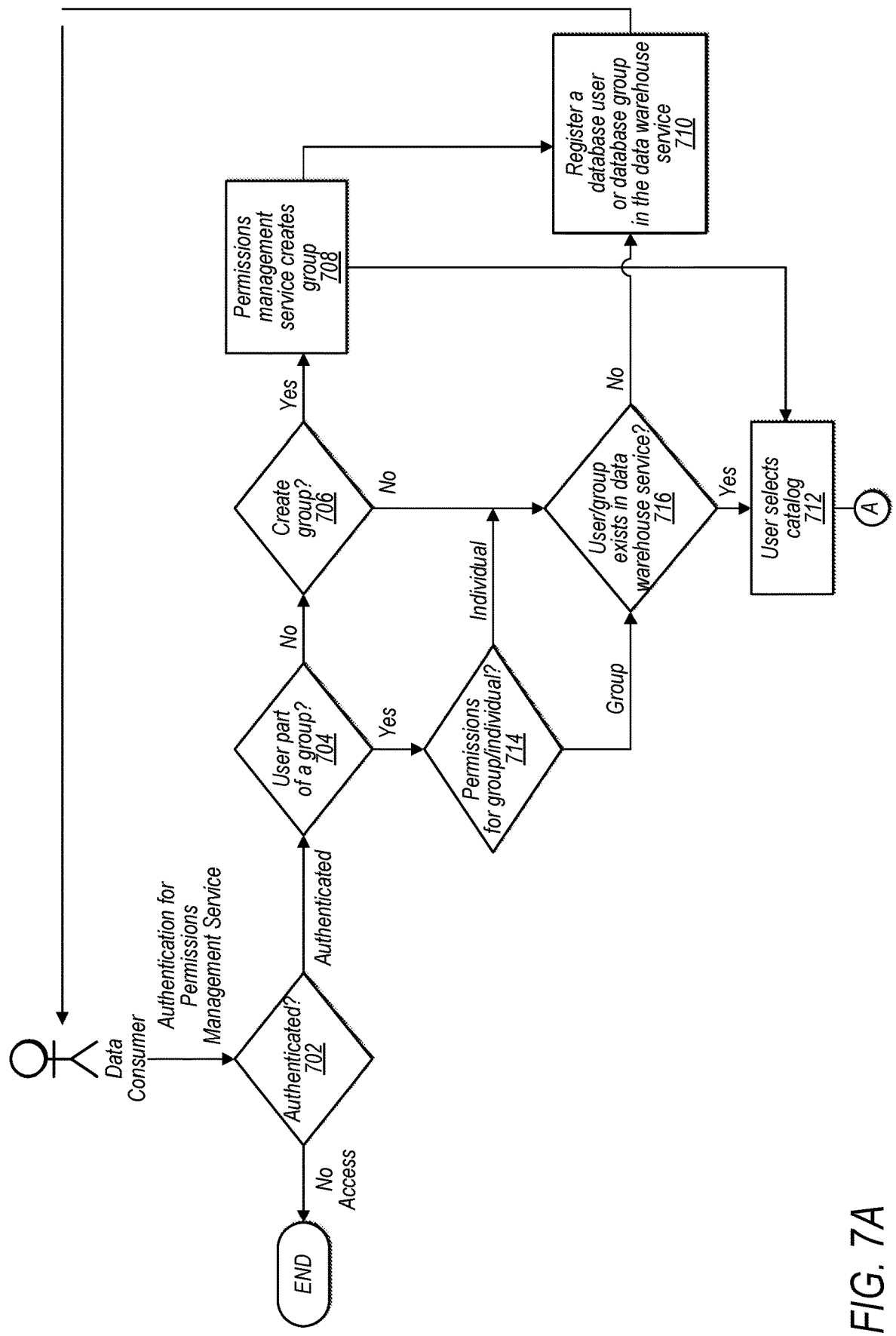
FIGS. 7A and 7B is a high-level flowchart illustrating various methods and techniques to implement scalable permissions management for granular levels of database access, according to some embodiments.
Figure 7B:
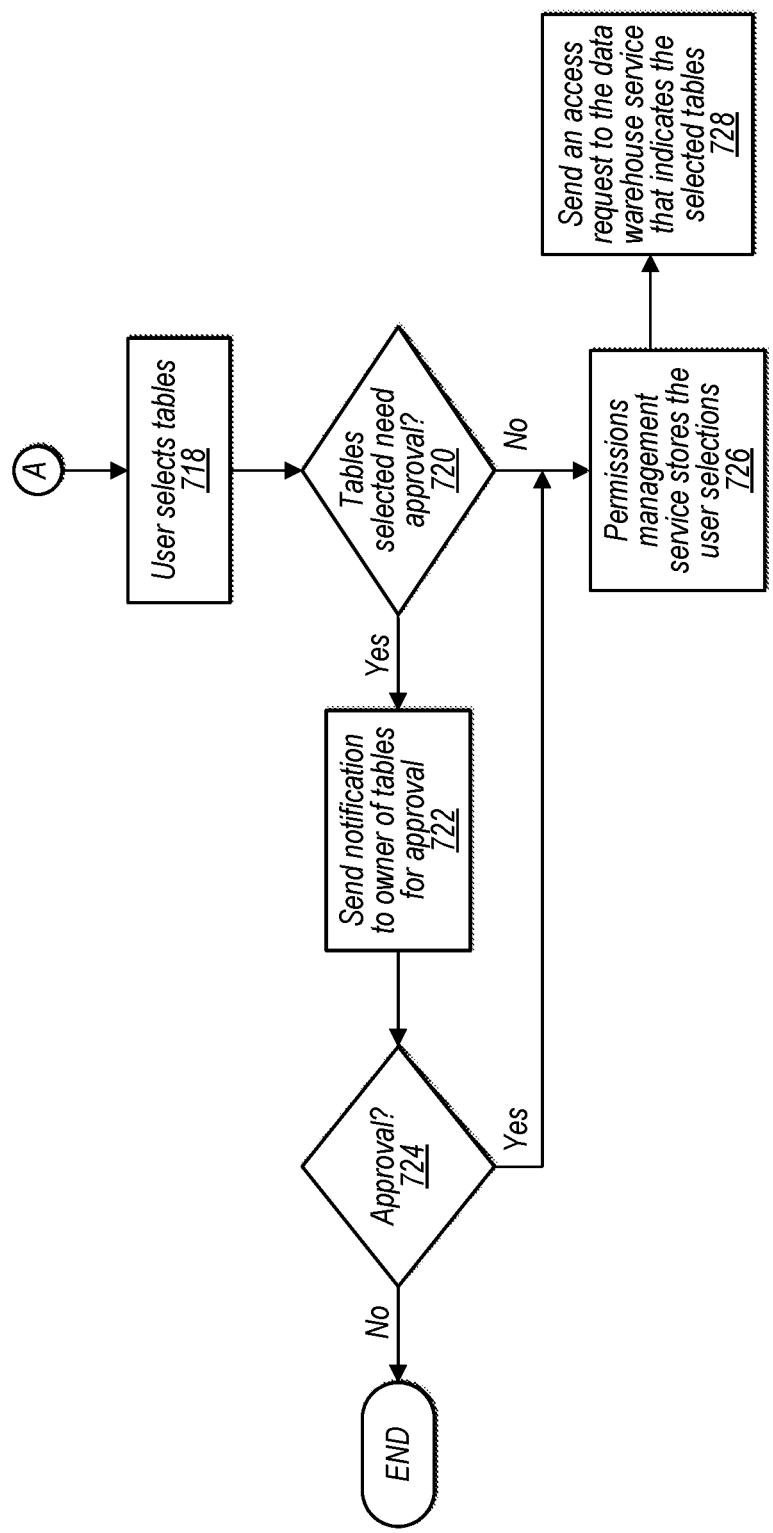
Figure 8:
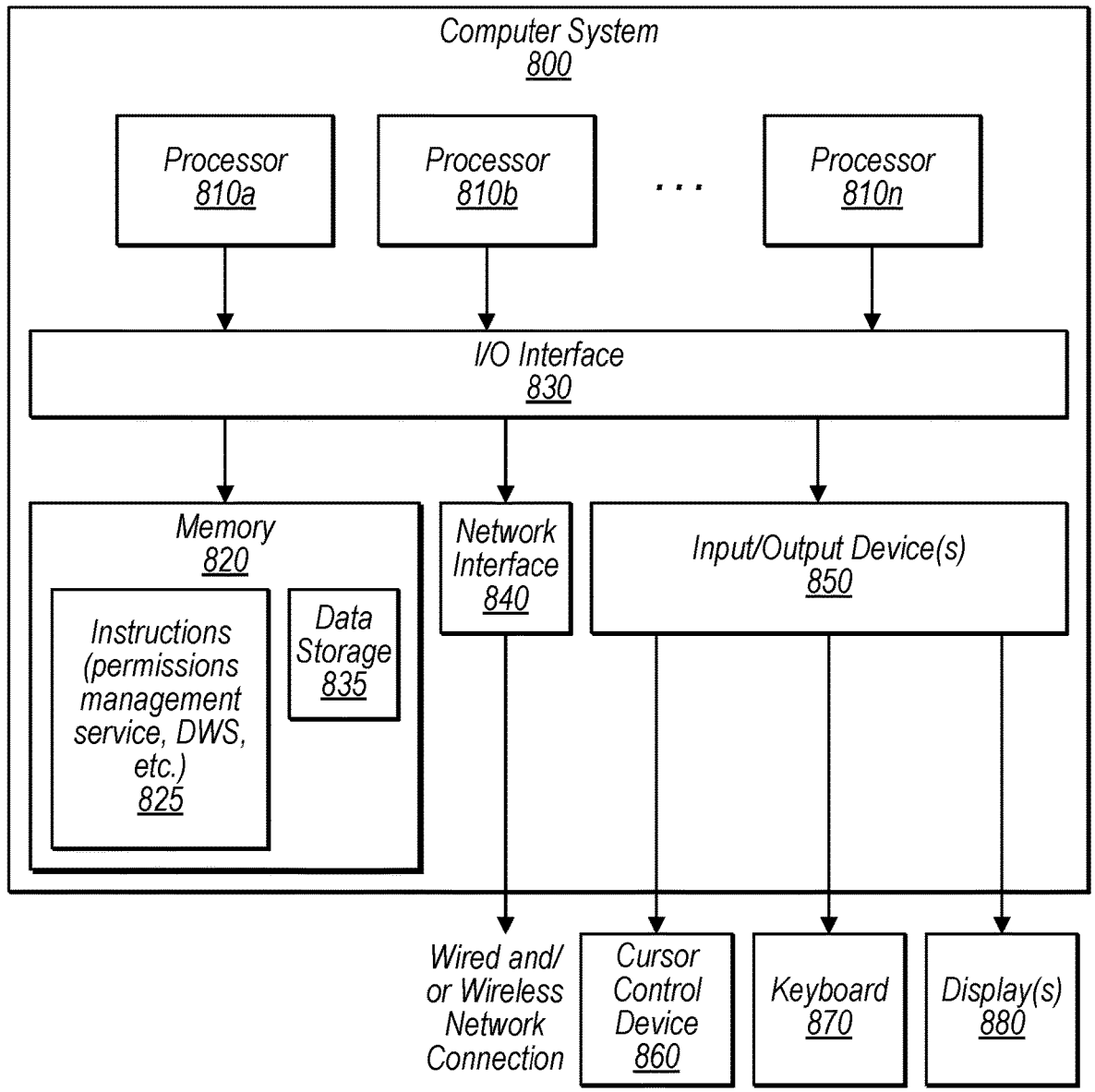
FIG. 8 is a block diagram illustrating an example computing system, according to some embodiments.

FIGS. 7A and 7B is a high-level flowchart illustrating various methods and techniques to implement scalable permissions management for granular levels of database access, according to some embodiments.

At block 702, the permissions management service receives a request from a user/data consumer (e.g., a request to login/use the permissions management service to select objects of one or more databases to request access to). If the request is not authenticated, then the request is denied and the process ends. If the request is authenticated (e.g., via federated user login, and temporary credentials are used to login the user for the data warehouse service), then at block 704, the permissions management service determines whether the user is a member of a group of the permissions management service. If not, then at block 706, the permissions management service determines whether to create a new group in the permissions management service that the user can be assigned as a member of (if not, then the process proceeds to block 716, described below).

If the permissions management service determines to create a new group, then the permissions management service creates the group at block 708. The permissions management service then sends a request to the data warehouse service to register the new group in the data warehouse service (e.g., a new database group that corresponds to the new group) at block 710 and proceeds to block 712, where the user selects a data catalog from a list of available data catalogs (each data catalog may represent a different database of the data warehouse service). In embodiments, the permissions management service does not proceed to block 710, but does proceed to block 712, where the permissions management service provides a data catalog to the user that includes the database objects that are available for selection to members of the group (the groups in the permissions management service may not need to exist in the data warehouse service because each service manages their own groups).

Returning to block 704, if the permissions management service determines that the user is a member of a group, then at block 714, the permissions management service determines whether to use permissions assigned to the group or permissions assigned to the user. In some embodiments, the permissions management service may choose to user the permissions that provide the greatest amount of data access (e.g., access to the largest number of objects and/or access to the largest number of different databases of the data warehouse service). In embodiments, the user will indicate whether to use the permissions assigned to the user or the permissions assigned to the group that the user is a member of.

At block 716, the permissions management service determines whether the user and/or the group is registered with the data warehouse service (depending on whether the permissions for the individual or the group are being used). If the user does not exist in the data warehouse service as a registered database user, then at block 710, the permissions management service may register the user with the data warehouse service as a registered database user. In embodiments, the permissions management service may send a request to the data warehouse service and/or to a database administrator/individual to register the user.

If the group permissions are being used and the group does not exist in the data warehouse service as a registered database user, then at block 710, the permissions management service may register the group with the data warehouse service as a registered database group (similar to above, the service may send a request to the data warehouse service and/or to a database administrator/individual to register the groups). However, in some embodiments, the permissions management service may not register the group the permissions management service, since the groups in the permissions management service do not need to have a corresponding group in the data warehouse service. At block 712, the user selects a data catalog from a list of available data catalogs, based on either the user permissions or the group permissions (each data catalog may represent a different database of the data warehouse service).

At block 718 of FIG. 6B, the permissions management service, the user selects tables from a list of tables available for selection from the database/data catalog that was selected by the user at block 716. At block 720, the permissions management service determines whether one or more of the selected tables require approval for access. If so, then at block 722, the permissions management service sends notifications/requests for approval to the data owner(s) for those tables.

At block 724, if the data owner(s) deny approval (or do not provide approval within a predetermined time period), then the process ends. If the data owner(s) provide approval, then at block 726, the permissions management service stores the user selections to a configuration database and sends an access request to the data warehouse service (e.g., a request to grant access to the user for the selected tables). At block 728, the data warehouse service sends an access request to the data warehouse service that indicates the selected tables.

In embodiments, the access request may also include a user ID and/or user credentials that identify the user. The data warehouse service may determine, based on the user ID and/or user credentials, that the user has been logged into the data warehouse service (e.g., user the temporary credentials) and in response, perform the actions needed in order to grant the requested access to the database object(s)). For example, the user/database user may be mapped to a database group for each object, as described for FIG. 3. In some embodiments, the data warehouse service may grant the user access to each object (instead of mapping the user to a database group). After the data warehouse service has granted access to the objects to the user (e.g., via one or more grant commands), then the user may run queries against those objects and/or perform any other actions that require permission to access those objects. Although tables are provided as the selected objects in the above example, in embodiments any number of different types of databased objects may be selected (e.g., tables, views, schemas, etc.).

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors.

The program instructions may implement the functionality described herein (e.g., the functionality of the permissions management service, data management service, and any other components that implement the techniques described herein). The various methods as illustrated in the figures and described herein represent example embodiments of methods. The order of any method may be changed, and various elements may be added, reordered, combined, omitted, modified, etc.

Embodiments implement scalable permissions management for granular levels of database access, which may interact with various other systems or devices. One such computer system is illustrated by FIG. 7. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. Display(s) may include standard computer monitor(s) and/or other display systems, technologies or devices, in one embodiment. In some embodiments, it is contemplated that embodiments may be implemented using a single instance of computer system 700, while in other embodiments multiple such systems, or multiple nodes making up computer system 700, may host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions, in one embodiment. For example, in various embodiments, processors 710 may be general-purpose or embedded processors implementing any of a variety of instruction set architectures (ISAs), such as the x86, PowerPC, SPARC, or MIPS ISAs, ARM, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 720 may store program instructions 725 and/or data accessible by processor 710, in one embodiment. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the permissions management service, data management service, and any other components, etc.) are shown stored within system memory 720 as program instructions 725 and data storage 735, respectively. In other embodiments, program instructions and/or data may be received, sent or stored upon different types of computer-accessible media or on similar media separate from system memory 720 or computer system 700. A computer-accessible medium may include non-transitory storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740, in one embodiment.

In one embodiment, I/O interface 730 may be coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI)

bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may allow data to be exchanged between computer system 700 and other devices attached to a network, such as other computer systems, or between nodes of computer system 700, in one embodiment. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700, in one embodiment. Multiple input/output devices 750 may be present in computer system 700 or may be distributed on various nodes of computer system 700, in one embodiment. In some embodiments, similar input/output devices may be separate from computer system 700 and may interact with one or more nodes of computer system 700 through a wired or wireless connection, such as over network interface 740.

As shown in FIG. 7, memory 720 may include program instructions 725 that implement the various embodiments of the systems as described herein, and data store 735, comprising various data accessible by program instructions 725, in one embodiment. In one embodiment, program instructions 725 may include software elements of embodiments as described herein and as illustrated in the Figures. Data storage 735 may include data that may be used in embodiments (e.g., configuration data, user selections, database objects, data catalogs, reports, etc.). In other embodiments, other or different software elements and data may be included.

Those skilled in the art will appreciate that computer system 700 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1100 may be transmitted to computer system 1100 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors; and
one or more memories, wherein the one or more memories have stored thereon instructions, which when executed by the one or more processors of a provider network, cause the one or more processors to:
implement a permissions management service, wherein the permissions management service is configured to, for individual users of a plurality of users registered with a database service:
receive, from a data owner, specification of a plurality of tables of at least one database of the database service to be available for the user to request access to;
subsequent to the reception of the specification of the plurality of tables, receive a request from a user;
authenticate the user;

subsequent to the authentication of the user, determine, based on the specification from the data owner, the plurality of tables to be available for the user to request access to;

based on the determination of the plurality of tables to be available for the user to request access to, provide, by the permissions management service to a user interface, an indication of the plurality of tables that are available for the user to request access to;

receive, from the user via user input, a selection of one or more tables from among the plurality of tables indicated by the permissions management service to the user interface as available for the user to request access to; and based on the selection received from the user of the one or more tables, send to the database service an access request that comprises an indication of the one or more tables, wherein the permissions management service determines whether approval is to be obtained for the one or more tables before the sending of the access request; and implement the database service, wherein the database service is configured to:

receive the access request form the permissions management service; and based on the reception of the access request, grant to the user permission to access the one or more tables of the at least one database.

2. The system as recited in claim 1, wherein the permissions management service is further configured to:

receive, from the data owner, a specification of one or more of:

at least one view of the at least one database to be available for the user to request access to, at least one group of tables of the at least one database to be available for the user to request access to, or at least one schema of the at least one database to be available for the user to request access to;

based on the authentication of the request, determine one or more of the at least one view, the at least one group of tables, or the at least one schema to be available for the user to request access to;

provide an indication of the one or more of the at least one view, the at least one group of tables, or the at least one schema available for the user to request access to; and receive, from the user, a selection of one or more of the at least one view, the at least one group of tables, or the at least one schema, wherein the access request comprises an indication of the one or more of the at least one view, the at least one group of tables, or the at least one schema.

3. The system as recited in claim 1, wherein the permissions management service is further configured to:

receive, from the data owner, specification of another plurality of tables of the at least one database to be available for users of a group to request access to;

subsequent to the reception of the specification of the other plurality of tables, receive an additional request from an additional user;

authenticate the additional request based at least on credentials provided by the additional request;

subsequent to the authentication of the additional request, determine that the additional user is a member of the group of the permissions management service;

based on the determination that the additional user is a member of the group, determine the other plurality of tables to be available for the additional user to request access to;

provide an indication of the other plurality of tables;

receive, from the additional user, a selection of one or more of the other plurality of tables; and based on the selection from the user of the one or more other tables, send to the database service an access request that comprises an indication of the one or more other tables.

4. The system as recited in claim 3, wherein the permissions management service is further configured to:

receive, from the data owner, an additional specification of the other plurality of tables of the at least one database to be available for users of different group to view as a catalog of tables, wherein the other plurality of tables are to be unavailable for the users of the different group to request access to;

subsequent to the reception of the additional specification of the other plurality of tables, receive a different request from a different user of a different group;

authenticate the different request based at least on credentials provided by the different request;

subsequent to the authentication of the different request, determine that the different user is a member of the different group;

based on the determination that the different user is a member of the different group, determine the other plurality of tables to be available to the different user to view as a catalog of tables; and provide an indication of the other plurality of tables as the catalog of tables, wherein the other plurality of tables are unavailable for the different user to request access to.

5. The system as recited in claim 1, wherein to grant to the user permission to access the one or more tables of the at least one database, the database service is further configured to:

for different tables of the one or more tables:

assign the user as a member of a database group associated with the table, wherein the database group is granted permission to access the table.

6. A method, comprising:

performing, by a permissions management service implemented by one or more computing devices:

receiving a specification of a plurality of objects of at least one database of a database service to be available for a user or users of a group to request access to;

subsequent to receiving the specification of the plurality of objects, receiving a request from the user or a particular user of the group;

authenticating the user;

subsequent to authenticating the user, determining the plurality of objects to be available for the user or the particular user of the group to request access to;

based on the determination of the plurality of objects to be available for the user or the particular user of the group to request access to, providing, by the permissions management service to a user interface, an indication of the plurality of objects that are available for the user or the particular user of the group to request access to;

receiving, from the user or the particular user of the group via user input, a selection of one or more objects from among the plurality of objects indicated by the permissions management service to the user interface as available for the user or the particular user of the group to request access to; and based on receiving the selection of the one or more objects, sending to the database service an access request that indicates the one or more objects.

7. The method as recited in claim 6, further comprising:
receiving a specification of one or more of:
at least one table of the at least one database to be available for the user or users of the group to request access to,
at least one view of the at least one database to be available for the user or users of the group to request access to,
at least one group of tables of the at least one database to be available for the user or users of the group to request access to, or
at least one schema of the at least one database to be available for the user or users of the group to request access to;
based on the authentication of the request, determining one or more of the at least one table, the at least one view, the at least one group of tables, or the at least one schema to be available for the user or the particular user of the group to request access to;
providing an indication of the one or more of the at least one table, the at least one view, the at least one group of tables, or the at least one schema available for the user or the particular user of the group to request access to; and
receiving, from the user or the particular user of the group, a selection of one or more of the at least one table, the at least one view, the at least one group of tables, or the at least one schema, wherein the access request comprises an indication of the one or more of the at least one table, the at least one view, the at least one group of tables, or the at least one schema.

8. The method as recited in claim 6, wherein determining the plurality of objects to be available for the user or the particular user of the group to request access to comprises:
determining that the particular user is a member of the group of the permissions management service; and
based on determining that the particular user is a member of the group, determining the plurality of objects to be available for the particular user to request access to.

9. The method as recited in claim 6, wherein the data associated with the client comprises a plurality of events, and wherein modifying the data to generate modified data comprises:
receiving another specification of another plurality of objects of the at least one database to be available for users of another group to view as a catalog of objects, wherein the other plurality of objects are to be unavailable for the users of the other group to request access to;
subsequent to receiving the other specification of the other plurality of objects, receiving another request from another user;
authenticating the other request based at least on credentials provided by the other request;
subsequent to authenticating the other request, determining that the other user is a member of the other group;
based on determining that the other user is a member of the other group, determining the other plurality of objects to be available to the other user to view as a catalog of objects; and providing an indication of the other plurality of objects as the catalog of objects, wherein the other plurality of objects are unavailable for the other user to request access to.

10. The method as recited in claim 6, further comprising:
receiving an indication that at least one of the plurality of objects requires access approval of a given data owner in order to grant users permission to access the at least one object;
receiving, from the user, a selection of a particular object of the at least one objects that require access approval;
based on the selection of the particular object, sending, to a data owner, a request for access approval for the particular object;
receiving, from the data owner, an indication of the access approval for the particular object; and
based on the indication of the access approval, sending to the database service an access request that comprises an indication of the particular object.

11. The method as recited in claim 10, wherein the particular object is a table, and wherein sending, to a data owner, a request for access approval for the particular object comprises:
determining that metadata of the table indicates that the table requires access approval of a given data owner in order to grant users permission to access the at least one object.

12. The method as recited in claim 6, wherein a given object of the plurality of objects to be available for the user or the particular user comprises a table with a plurality of columns, and wherein receiving a specification of a plurality of objects of at least one database of a database service to be available for a user or users of a group to request access to comprises:
receiving a specification of a subset of the plurality of columns of the table to be available for the user or the users of the group to request access to, wherein the subset of columns is less than the plurality of columns.

13. The method as recited in claim 12, wherein providing the indication of the plurality of objects comprises:
providing, to the user or the particular user, an indication of the subset of the plurality of columns of the table, without providing an indication of remaining columns of the table.

14. The method as recited in claim 6, further comprising:
receiving a specification of an additional plurality of objects of the at least one database of the database service to be available for the user or users of the group to request access to.

15. One or more non-transitory computer-accessible storage media storing program instructions that when executed on or across one or more processors cause the one or more processors to implement a permissions management service:
receive a specification of a plurality of objects of at least one database of a database service to be available for a user or users of a group to request access to;
subsequent to the reception of the specification of the plurality of objects, receive a request from the user or a particular user of the group;
authenticate the user;
subsequent to the authentication of the user, determine the plurality of objects to be available for the user or the particular user of the group to request access to;
based on the determination of the plurality of objects to be available for the user or the particular user of the group to request access to, provide, by the permissions management service to a user interface, an indication of the plurality of objects that are available for the user or the particular user of the group to request access to;

receive, from the user or the particular user of the group via user input, a selection of one or more objects from among the plurality of objects indicated by the permissions management service to the user interface as available for the user or the particular user of the group to request access to; and based on the reception of the selection of the one or more objects, send to the database service an access request that indicates the one or more objects.

16. The one or more storage media as recited in claim 15, wherein the program instructions when executed on or across the one or more processors further cause the one or more processors to:

receive a specification of one or more of:
at least one table of the at least one database to be available for the user or users of the group to request access to,
at least one view of the at least one database to be available for the user or users of the group to request access to,
at least one group of tables of the at least one database to be available for the user or users of the group to request access to, or
at least one schema of the at least one database to be available for the user or users of the group to request access to;

based on the authentication of the request, determine one or more of the at least one table, the at least one view, the at least one group of tables, or the at least one schema to be available for the user or the particular user of the group to request access to;

provide an indication of the one or more of the at least one table, the at least one view, the at least one group of tables, or the at least one schema available for the user or the particular user of the group to request access to; and receive, from the user or the particular user of the group, a selection of one or more of the at least one table, the at least one view, the at least one group of tables, or the at least one schema, wherein the access request comprises an indication of the one or more of the at least one table, the at least one view, the at least one group of tables, or the at least one schema.

17. The one or more storage media as recited in claim 15, wherein the program instructions when executed on or across the one or more processors further cause the one or more processors to:

receive an indication that at least one of the plurality of objects requires access approval of a given data owner in order to grant users permission to access the at least one object;

receive, from the user or the particular user of the group, a selection of a particular object of the at least one objects that require access approval;

based on the selection of the particular object, send, to a data owner, a request for access approval for the particular object;

receive, from the data owner, an indication of the access approval for the particular object; and based on the reception of the indication of the access approval, send to the database service an access request that comprises an indication of the particular object.

18. The one or more storage media as recited in claim 15, wherein the program instructions when executed on or across the one or more processors further cause the one or more processors to:

receive a specification of an additional plurality of objects of the at least one database of the database service to be available for the user or users of the group to request access to.

19. The one or more storage media as recited in claim 18, wherein a given object of the plurality of objects to be available for the user or the particular user comprises a table with a plurality of rows, and wherein to receive a specification of a plurality of objects of at least one database of a database service to be available for a user or users of a group to request access to, the program instructions when executed on or across the one or more processors further cause the one or more processors to:

receive a specification of a subset of the plurality of rows of the table to be available for the user or the users of the group to request access to, wherein the subset of rows is less than the plurality of rows.

20. The one or more storage media as recited in claim 19, wherein to provide an indication of the plurality of objects, the program instructions when executed on or across the one or more processors further cause the one or more processors to:

provide, to the user or the particular user, an indication of the subset of the plurality of rows of the table, without providing an indication of remaining rows of the table.

* * * * *